United States Patent
Chitlur et al.

(10) Patent No.: US 7,930,459 B2
(45) Date of Patent: Apr. 19, 2011

(54) COHERENT INPUT OUTPUT DEVICE

(75) Inventors: Nagabhushan Chitlur, Portland, OR (US); Linda Rankin, Portland, OR (US); Dave Dunning, Portland, OR (US); Shunyu Zhu, Beijing (CN); Steven Zhang, Hillsboro, OR (US); Chuanhua Song, Beijing (CN); Ling Liu, Beijing (CN); Zhihong Yu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 11/864,173

(22) Filed: Sep. 28, 2007

(65) Prior Publication Data

US 2009/0089468 A1    Apr. 2, 2009

(51) Int. Cl.
*G06F 13/14* (2006.01)
*G06F 13/36* (2006.01)
*G06F 13/00* (2006.01)
*G06F 13/28* (2006.01)

(52) U.S. Cl. ......... 710/305; 710/306; 711/141; 711/210

(58) Field of Classification Search .................. 710/305, 710/306; 711/141, 210
See application file for complete search history.

(56) References Cited

U.S. PATENT DOCUMENTS

| | | | | |
|---|---|---|---|---|
| 4,564,900 A * | 1/1986 | Smitt | ............................ | 709/212 |
| 5,371,861 A * | 12/1994 | Keener et al. | ................. | 710/305 |
| 5,630,163 A * | 5/1997 | Fung et al. | ..................... | 710/307 |
| 5,632,038 A * | 5/1997 | Fuller | ........................... | 713/324 |
| 5,701,483 A * | 12/1997 | Pun | ............................... | 719/321 |
| 5,717,663 A * | 2/1998 | Fujita | ........................... | 369/52.1 |
| 5,717,952 A * | 2/1998 | Christiansen et al. | .......... | 710/22 |
| 6,219,737 B1 * | 4/2001 | Chen et al. | ..................... | 710/310 |
| 6,314,486 B1 * | 11/2001 | Schulz et al. | ................. | 710/310 |
| 6,314,496 B1 * | 11/2001 | Razdan et al. | ................. | 711/141 |
| 6,353,877 B1 * | 3/2002 | Duncan et al. | ................ | 711/155 |
| 6,389,526 B1 * | 5/2002 | Keller et al. | .................... | 712/30 |
| 6,636,926 B2 * | 10/2003 | Yasuda et al. | ................. | 710/305 |
| 6,636,947 B1 * | 10/2003 | Neal et al. | ..................... | 711/141 |
| 6,647,453 B1 * | 11/2003 | Duncan et al. | ................ | 710/306 |
| 6,681,283 B1 * | 1/2004 | Thekkath et al. | ............. | 710/305 |
| 6,721,813 B2 * | 4/2004 | Owen et al. | ....................... | 710/6 |
| 6,826,653 B2 * | 11/2004 | Duncan et al. | ................ | 711/141 |

(Continued)

FOREIGN PATENT DOCUMENTS

GB       2271202 A  *  4/1994

(Continued)

OTHER PUBLICATIONS

Ikedo et al., "An architecture based on the memory mapped node addressing in reconfigurable interconnection network", Mar. 17-21, 1997, IEEE, Proceedings of the Second Aizu International Symposium on Parallel Algorithms/Architecture Synthesis, pp. 50-57.*

(Continued)

*Primary Examiner* — Faisal M Zaman
(74) *Attorney, Agent, or Firm* — Buckley, Maschoff & Talwalkar LLC

(57) ABSTRACT

According to some embodiments, data to be exchanged via a system input output interface may be determined at a processor. It may then be arranged to exchange the data via a coherent input output device coupled to a coherent system interconnect. Other embodiments are described.

5 Claims, 4 Drawing Sheets

U.S. PATENT DOCUMENTS

| | | | |
|---|---|---|---|
| 6,832,268 B2 * | 12/2004 | Tan et al. | 710/5 |
| 6,836,813 B1 * | 12/2004 | Gulick | 710/306 |
| 6,851,009 B1 * | 2/2005 | Regula | 710/305 |
| 6,862,646 B2 * | 3/2005 | Bonola et al. | 710/306 |
| 6,883,047 B2 * | 4/2005 | Warren et al. | 710/67 |
| 6,883,057 B2 * | 4/2005 | Moy | 710/314 |
| 6,934,806 B2 * | 8/2005 | Genduso et al. | 711/135 |
| 7,000,089 B2 * | 2/2006 | Durr et al. | 711/202 |
| 7,124,252 B1 * | 10/2006 | Khare et al. | 711/137 |
| 7,206,879 B2 * | 4/2007 | Sano et al. | 710/105 |
| 7,210,000 B2 * | 4/2007 | Creta et al. | 710/316 |
| 7,260,749 B2 * | 8/2007 | Cox | 714/44 |
| 7,383,409 B2 * | 6/2008 | Steely et al. | 711/169 |
| 7,643,825 B2 * | 1/2010 | Fritsch et al. | 455/422.1 |
| 7,774,522 B2 * | 8/2010 | Bouvier | 710/55 |
| 2002/0004886 A1 * | 1/2002 | Hagersten et al. | 711/141 |
| 2004/0078682 A1 * | 4/2004 | Huang | 714/37 |
| 2006/0004965 A1 * | 1/2006 | Tu et al. | 711/137 |
| 2006/0123195 A1 * | 6/2006 | Mukherjee | 711/118 |
| 2008/0229009 A1 * | 9/2008 | Gaither et al. | 711/113 |
| 2009/0089475 A1 * | 4/2009 | Chitlur et al. | 710/305 |
| 2009/0327564 A1 * | 12/2009 | Chitlur | 710/305 |

FOREIGN PATENT DOCUMENTS

| | | | |
|---|---|---|---|
| JP | 2003030048 A | * | 1/2003 |
| JP | 2010015572 A | * | 1/2010 |
| JP | 2010027048 A | * | 2/2010 |

OTHER PUBLICATIONS

Tomasevic et al., "Hardware approaches to cache coherence in shared-memory multiprocessors, Part 1", Oct. 1994, IEEE, IEEE Micro, vol. 14, No. 5, pp. 52-59.*

Kumar et al., "Efficient and scalable cache coherence schemes for shared memory hypercube multiprocessors", Nov. 14-18, 1994, IEEE, Proceedings of Supercomputing '94, pp. 498-507.*

Chang et al., "An efficient hybrid cache coherence protocol for shared memory multiprocessors", Aug. 12-16, 1996, IEEE, Proceedings of the 1996 International Conference on Parallel Processing, vol. 1, pp. 172-179.*

* cited by examiner

COHERENT INPUT OUTPUT DEVICE

BACKGROUND

Elements of a computer system may need to exchange information. For example, a Central Processing Unit (CPU) of a computer system may need to store information into and/or retrieve information from a memory unit. In some cases, Input Output (IO) information may be exchanged over one or more interfaces within the computer system. Moreover, the computer system may need to maintain the consistency of information that exists within various elements. For example, data stored in the cache of one element might need to match data stored within another element. Methods and apparatus that permit the flexible and efficient transfer of information within a computer system, while maintaining such consistency, may therefore be desirable.

DETAILED DESCRIPTION

Figure 1A:
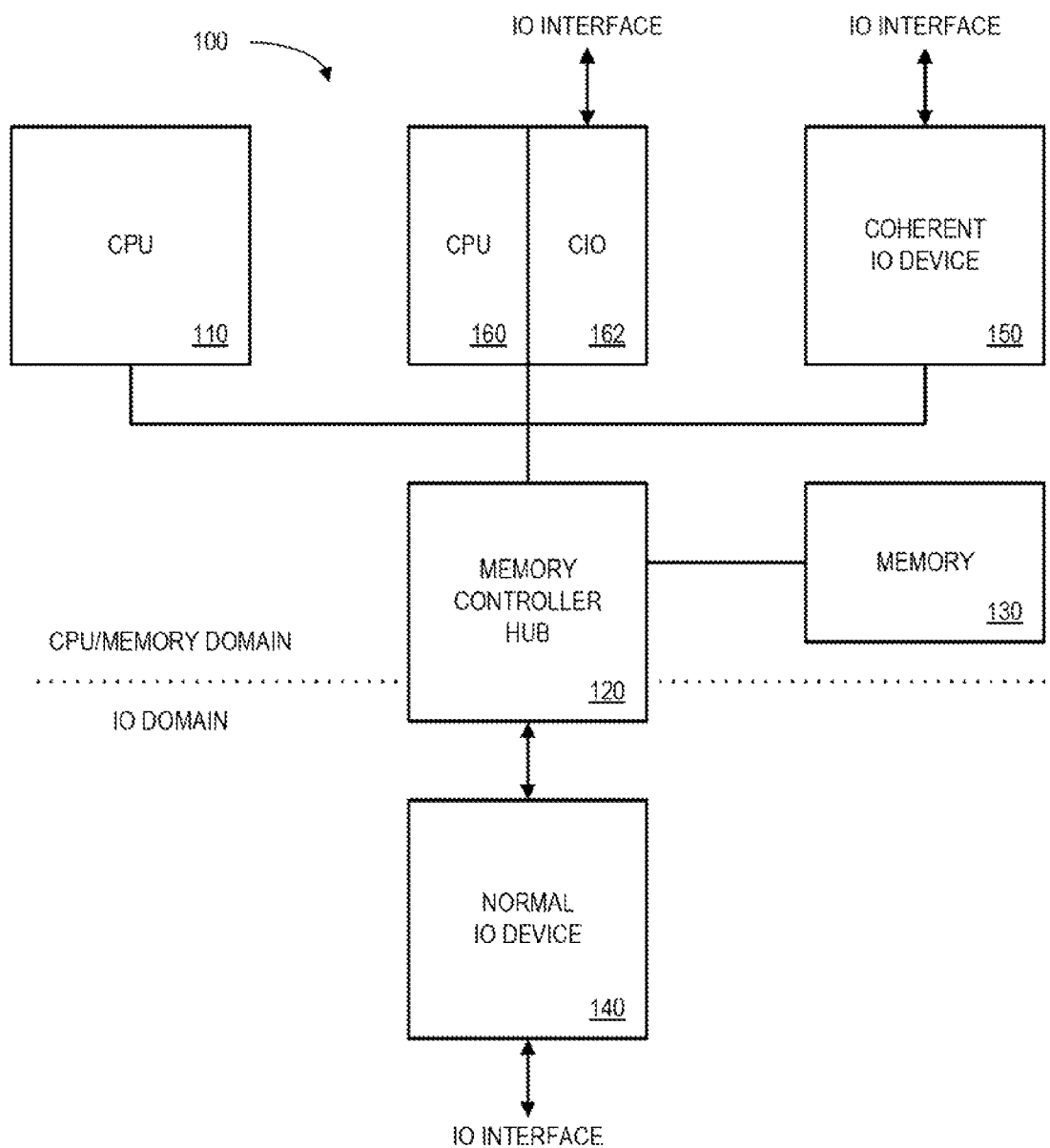
FIG. 1A is a block diagram of a system according to some embodiments.

Elements of a computer system may need to exchange information. For example, a Central Processing Unit (CPU) of a computer system may need to store information into and/or retrieve information from a memory unit. In some cases, Input Output (IO) information may be exchanged over one or more interfaces within the computer system. For example, FIG. 1A is a block diagram of a system 100 according to some embodiments. The system 100 might be associated with, for example, an electronics device such as a Personal Computer (PC), a server, a mobile computer, a Personal Digital Assistant (PDA), a wireless telephone, and/or a media device (e.g., a set-top box).

The system includes a CPU 110 that may exchange information with a memory 130 via a memory controller hub 120. The CPU 110 may also exchange information another CPU 160. Transfers of information between the CPUs 110, 160, the memory controller hub 120, and/or the memory 130 may occur in what is referred to as the "CPU/memory domain."

In some cases, the system may also exchange information via an IO interface. For example, the memory controller hub 120 may exchange information through an IO interface through a normal IO device 140. Transfers of information between the memory controller hub 120 and the normal IO device may occur in what is referred to as the "IO domain." In some cases, these elements of the system 100 may exchange information via an interface that operates in accordance with the Peripheral Component Interconnect (PCI) Standards Industry Group (SIG) standard entitled "Conventional PCI 2.2" or "PCI Express 1.0."

In such cases where IO devices reside in the IO domain, accesses to IO devices may need to pass through a memory controller hub (or a similar device) and accesses to the IO device may be bound by ordering rules (e.g., associated with a PCI interface).

According to some embodiments of the present invention, the CPU 110 may also transfer information with an IO interface within the CPU/memory domain. For example, the CPU 110 might transfer information with an IO interface via a coherent IO device 150 within the CPU/memory domain. The coherent IO device 150 might be associated with, for example, a Network Interface Controller (NIC) and/or a graphics controller. As another example, the CPU 110 might transfer information with an IO interface via a coherent IO portion 162 of another CPU 160 within the CPU/memory domain.

As used herein, the phrase "coherent IO device" may refer to, for example, an IO device capable of achieving relatively high performance by being directly connected to a coherent system interconnect (such as a front side bus or common system interconnect). Note that processor accesses to a coherent IO device may therefore have latencies and ordering characteristics similar to memory, letting a processor directly manage the IO resources efficiently. Interfacing with devices in this manner may also let IO performance scale along with the processor's performance. In addition, a coherent IO device may, according to some embodiments, use an unordered IO programming model (e.g., a memory consistency model) which may be more flexible and efficient as compared to a PCI interface.

Figure 1B:
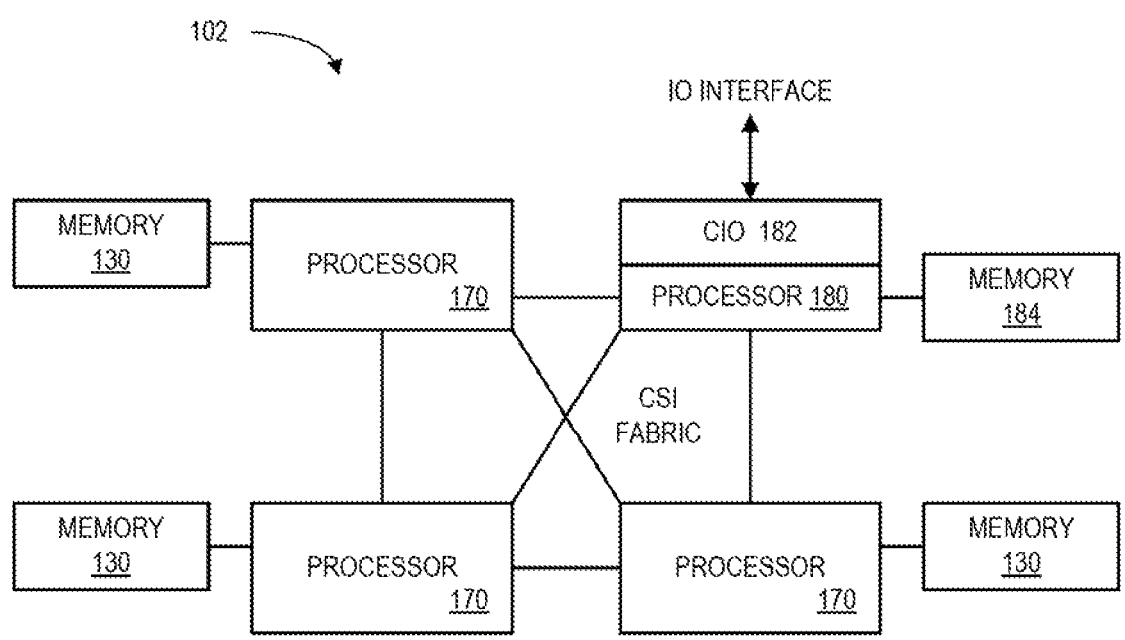
FIG. 1B is a block diagram of a system according to some other embodiments.

FIG. 1B is a block diagram of a system 102 according to some other embodiments. In this case, a number of processors 170 are interconnected and each processor 170 may be coupled to a memory 130. According to this embodiment, one or more processors 180 may include a coherent IO portion 182 adapted to communicate directly via an IO interface.

Note that a coherent IO device may be, according to some embodiments, fully cache coherent and/or be directly connected to a coherent system interconnect (e.g., a front side bus). As a result, a coherent IO device may be able to expose resources using coherent transactions available on the interconnect.

Figure 2:
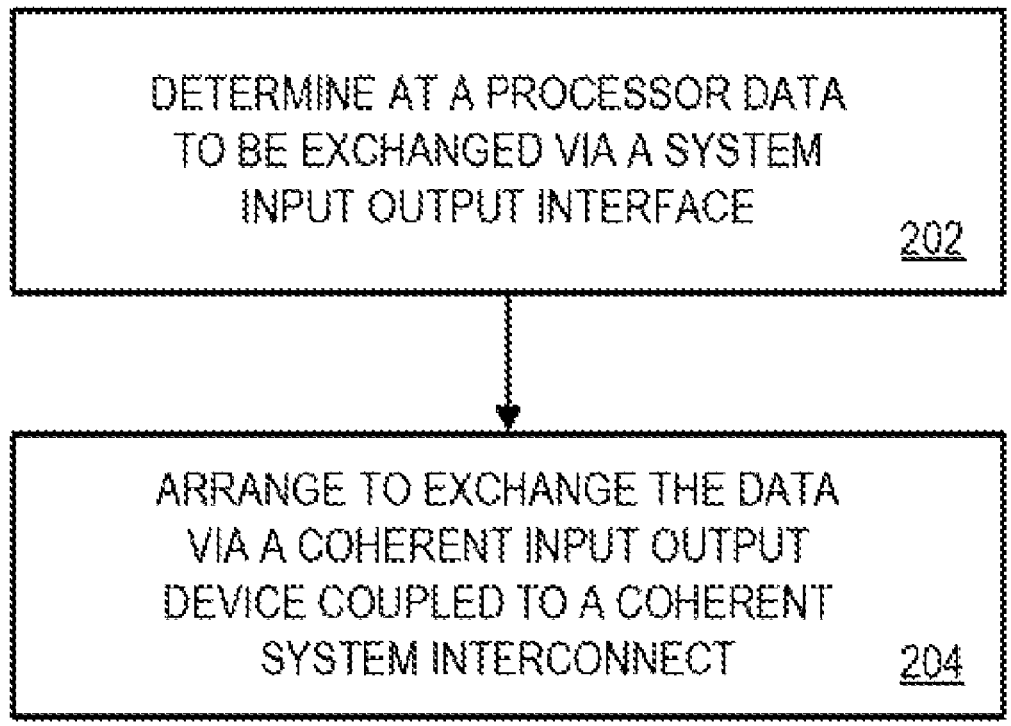
FIG. 2 is a flow diagram illustrating a method according to some embodiments.

FIG. 2 is a flow diagram illustrating a method according to some embodiments. The method may be performed, for example, in connection with the systems 100, 102 of FIGS. 1 and/or 2. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, data to be exchanged via a system input output interface is determined at a processor. For example, a processor may determine that information needs to be transmitted to or received from an IO interface associated with another processor, a network interface controller, or a graphics controller.

At 204, it is arranged to exchange the data via a coherent input output device coupled to a coherent system interconnect. For example, the coherent input output device may be directly coupled to the system interconnect and able to execute coherent transactions via the system interconnect (e.g., via a front side bus or a common system interface bus). In this case, the processor can exchange information with the IO interface without leaving the CPU/memory domain (e.g., without entering the IO domain).

Figure 3:
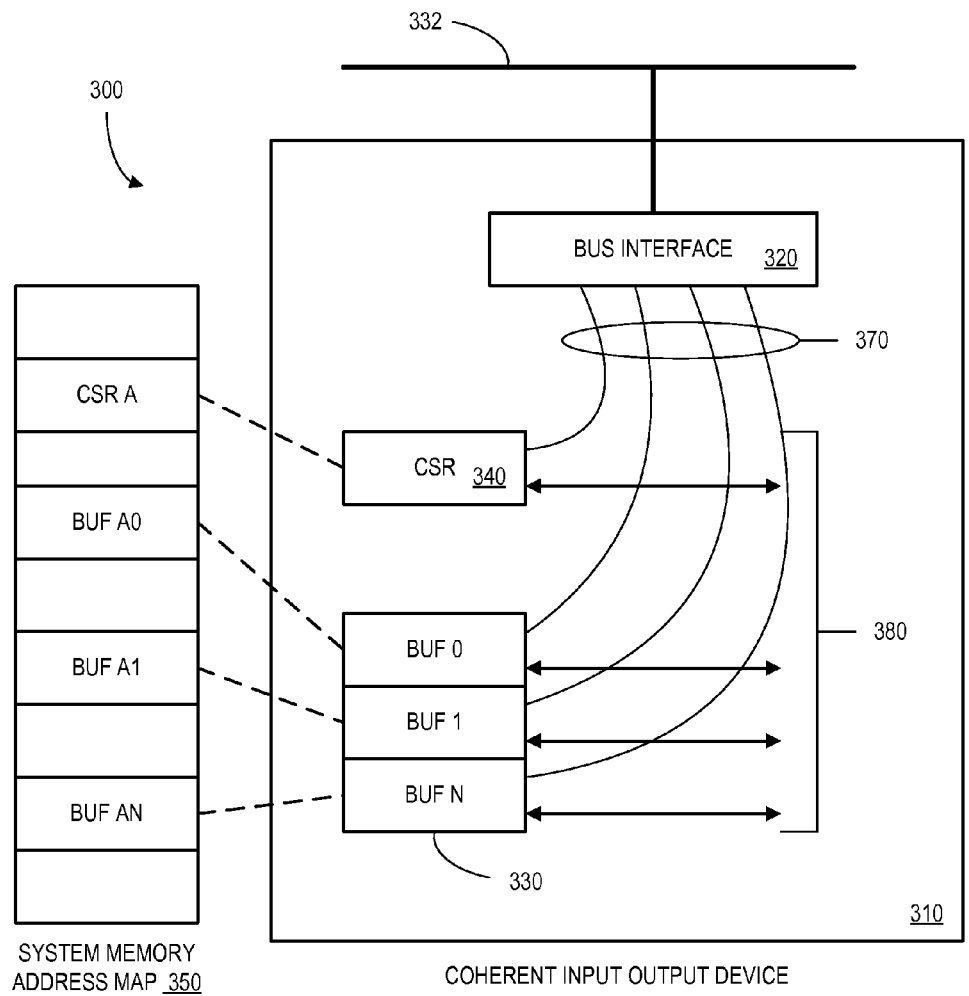
FIG. 3 is a block diagram of an apparatus according to some embodiments.

A coherent IO device may use one or more access mechanisms. For example, FIG. 3 is a block diagram of an apparatus 300 wherein a coherent IO device 310 accesses information via a bus 332 through a bus interface 320 (e.g., a front side bus interface). In this case, the access mechanisms may include a number of buffers 330 (e.g., BUF 0 through BUF N associated with other resources) that exchange information with the bus interface 320 via external, coherent paths 370. The buffers 330 also exchange information within the coherent IO device 310 via internal paths 380 that are not coherent.

According to some embodiments, the coherent IO device 310 includes a Control Status Region (CSR) registers 340. The coherent IO device 310 may, for example, implement CSR registers 340 using a memory mapped aperture of cacheable memory. As a result, processor reads/writes to via this aperture of memory may return/update the contents of the CSR registers 340. The cacheability of these CSR registers 340 may be, for example, managed by a combination of a device driver and/or NIC hardware. According to some embodiment, a coherent IO device may use an optimized polling mechanism to indicate change in the state of the hardware.

In some cases, coherent IO devices other than the CSR registers 340 may be directly accessible by the processor via apertures of memory backed by the buffers 330. Each aperture may, for example, have an external access path 370 used by the processor and an internal path 380 used by the device 310 itself. In some cases, updates made using the external access path 370 may result in the changes occurring in a cache coherent manner. The external path 370 may also allow the apertures to have Read/Write, Write only, or Read only attributes depending on the functionality apertures provide.

Note that the buffers 330 and/or CSR registers 340 may be mapped using a system memory address map 350. For example, a first CSR register 340 may be mapped to a particular area of the system memory address map 350 while a particular buffer (e.g., BUF 1) may be mapped to its own area of the system memory address map 350.

According to some embodiments, updates that occur via the internal paths 380 may not happen coherently, and the coherent IO device 310 may choose to update it coherently (note, however, that this may not be necessary). In this case, the coherent IO device 310 and/or device driver may help ensure that the state of a cacheline is compliant with a cache coherency protocol of the system. The internal update path 380 may be used, for example, when software is polling on events on the coherent IO device 310.

According to some embodiments, a coherent IO device may implement a push IO model in which a processor directly pushes data onto the coherent IO device (instead of the traditional model in which an IO device pulls data from memory after being instructed by the processor). The push IO model may be facilitated because device resources are directly accessible by the processor, and the status of the coherent IO device may be efficiently obtained using a polling model.

According to some embodiments, a coherent IO device uses a producer-consumer relationship using the processor-memory consistency model instead of PCI ordering rules. Such an approach may provide coherent IO accesses with lower effective latencies since coherent accesses might cause less disturbance to existing transactions. Note that PCI ordering rules may be relatively restrictive, resulting in a lot of queues in the system that may need to be flushed and/or fenced thereby hindering performance.

Thus, embodiments described herein may let elements of a computer system exchange information in ways that can reduce latencies and provide higher performance for streaming-type applications (since a processor may have a relatively low latency path to a coherent IO device). Moreover, embodiments may improve throughput for an IO device because access to the IO device might not be bound by PCI ordering rules (using instead the relatively weak ordering of the coherent interface). In addition, IO specific processing may be on-loaded to a processor because IO devices will exhibit latency and other characteristics of cacheable memory (e.g., it enables TCP IP functions might be moved into the processor).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Note that any embodiment described herein might be associated with, for example, topologies and/or configurations other than those illustrated by the FIGS. Similarly, the particular protocols and interface procedures that are described herein are provided only as examples and any number of other protocols and/or procedures may be associated with embodiments of the present invention.

The several embodiments described herein are solely for the purpose of illustration. Persons skilled in the art will recognize from this description other embodiments may be practiced with modifications and alterations limited only by the claims.

What is claimed is:

1. An apparatus, comprising:
   a coherent system interconnect;
   an input output interface;
   a coherent input output device coupled between the coherent system interconnect and the input output interface, wherein the coherent input output device is to exchange data between the input output interface and the coherent system interconnect;
   a control status register region within the coherent input output device, wherein the control status register region is coupled to both (1) an external coherent path to the coherent system interconnect and (2) an internal non-coherent path and further wherein the control status region registers are accessible via a memory mapped aperture of cacheable memory and other input output resources are directly accessible by a processor via writeback memory apertures, and a first memory aperture is associated with a read/write attribute, a second memory aperture is associated with a write only attribute, and a third memory aperture is associated with a read only attribute; and
   a plurality of coherent input output buffers within the coherent input output device, wherein each of the coherent input output buffers are coupled to both (1) an external coherent path to the coherent system interconnect and (2) an internal non-coherent path and further wherein each of the plurality of coherent input output buffers are mapped to a system memory address map, and the processor uses a push input output model such that the processor directly pushes data onto the coherent input output device;
   wherein updates that occur via the internal non-coherent paths do not happen coherently, and the coherent input output device ensures that the state of a cacheline is compliant with a cache coherency protocol.

2. The apparatus of claim 1, wherein the coherent system interconnect comprises a bus interface associated with at least one of: (i) a multi-drop front side bus or (ii) a common system interface bus.

3. The apparatus of claim 2, wherein the coherent input output device comprises at least one of: (i) an element integrated with a processor die, or (ii) an element that communicates with a processor via a bus.

4. The apparatus of claim 3, wherein coherent input output device executes coherent transactions via the system interconnect.

5. The apparatus of claim 1, wherein a polling mechanism is used to indicate a change in hardware state.

* * * * *